United States Patent
Choi et al.

(10) Patent No.: US 9,323,967 B2
(45) Date of Patent: Apr. 26, 2016

(54) METHOD AND SYSTEM OF PALLET PACKING, AND METHOD FOR PROVIDING DATA OF PALLET PACKING

(71) Applicant: Daegu Gyeongbuk Institute of Science and Technology, Dalseong-Goon, Daegu (KR)

(72) Inventors: Jae Sung Choi, Daegu (KR); Rock Hyun Choi, Gyeongsangbuk-do (KR); Hee kuk Kang, Seoul (KR); Byung Rak Son, Daegu (KR); Dong Ha Lee, Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 371 days.

(21) Appl. No.: 13/923,723

(22) Filed: Jun. 21, 2013

(65) Prior Publication Data

US 2013/0342353 A1  Dec. 26, 2013

(30) Foreign Application Priority Data

Jun. 22, 2012  (KR) .................. 10-2012-0067655
Jun. 21, 2013  (KR) .................. 10-2013-0071825

(51) Int. Cl.
*G08B 21/00*  (2006.01)
*G06K 7/10*  (2006.01)
(Continued)

(52) U.S. Cl.
CPC ............ *G06K 7/10366* (2013.01); *G06Q 10/08* (2013.01); *B65G 61/00* (2013.01)

(58) Field of Classification Search
USPC ............. 340/686.1, 540, 572.1, 572.7, 539.1, 340/539.11
See application file for complete search history.

(56) References Cited

U.S. PATENT DOCUMENTS

| | | | |
|---|---|---|---|
| 6,538,569 B1 * | 3/2003 | Dunn | H04B 5/0043 340/540 |
| 8,138,920 B2 | 3/2012 | Fuchida | |
| 8,421,627 B2 * | 4/2013 | Rinkes | H04Q 9/00 340/572.1 |

(Continued)

FOREIGN PATENT DOCUMENTS

| | | |
|---|---|---|
| KR | 1020050060704 A | 6/2005 |
| KR | 1020100021396 A | 2/2010 |
| KR | 1020110037721 A | 4/2011 |

OTHER PUBLICATIONS

Notice of Preliminary Rejection issued by Korean Intellectual Property Office in corresponding Korean Patent Application No. 10-2013-0071825 dated Oct. 16, 2014.

*Primary Examiner* — Daryl Pope
(74) *Attorney, Agent, or Firm* — Porzio, Bromberg & Newman, P.C.

(57) ABSTRACT

There are provided a method and a system of pallet packing that generate information on an article to be loaded and a loading place of the article on a specific pallet by recognizing a 3D position on which articles are loaded on a pallet, and a method for providing loading information of the article on the pallet by using loading information of the article generated by the method. More particularly, there are provided a method and a system of pallet packing that generate information on a 3D loading position of each article by using identification information of the pallet and each article and depth information for a whole area of the pallet acquired through a depth measurement sensor and a method for providing information on a loading shape of all articles or a state in which a specific article is loaded by using loading information of the article generated through the method.

17 Claims, 4 Drawing Sheets

(51) Int. Cl.
  *G06Q 10/08* (2012.01)
  *B65G 61/00* (2006.01)

(56) References Cited

U.S. PATENT DOCUMENTS

| | | | |
|---|---|---|---|
| 2008/0061963 A1* | 3/2008 | Schnitz | G06Q 10/08 340/539.13 |
| 2008/0174433 A1 | 7/2008 | Fuchida et al. | |
| 2008/0211631 A1* | 9/2008 | Sakamoto | G01S 5/0205 340/10.1 |
| 2009/0212915 A1* | 8/2009 | Ulrich | G06K 17/0022 340/10.1 |
| 2010/0164710 A1* | 7/2010 | Chung | G01S 5/0018 340/539.1 |
| 2011/0260868 A1 | 10/2011 | Fuchida | |

* cited by examiner

PALLET

PALLET

METHOD AND SYSTEM OF PALLET PACKING, AND METHOD FOR PROVIDING DATA OF PALLET PACKING

CROSS-REFERENCE TO RELATED APPLICATIONS

This application claims the priority of Korean Patent Application Nos. 10-2012-0067655 and 10-2013-0071825 respectively filed on Jun. 22, 2012 and Jun. 21, 2013 in the Korean Intellectual Property Office, the disclosure of which is incorporated herein by reference.

BACKGROUND OF THE INVENTION

1. Field of the Invention

The present invention relates to a method and a system of pallet packing that generate information on an article to be loaded and a loading place of the article on a specific pallet by recognizing a 3D position on which articles are loaded on a pallet, and a method for providing loading information of the article on the pallet by using loading information of the article generated by the method. More particularly, the present invention relates to a method and a system of pallet packing that generate information on a 3D loading position of each article by using identification information of the pallet and each article and depth information for a whole area of the pallet acquired through a depth measurement sensor and a method for providing information on a loading shape of all articles or a state in which a specific article is loaded by using loading information of the article generated through the method.

2. Description of the Related Art

A method of managing a parcel service or distribution is achieved in such a manner that articles are stored and arranged in a warehouse and the stored and arranged articles are released when necessary. When the management method of the distribution is described in detail, a lot of articles are first loaded on the pallet at the time of storing the articles, and a list of the articles is arranged and thereafter, the pallet and the articles loaded on the pallet are transported to and stored in the warehouse by using a forklift, or the like. Thereafter, when the releasing of the specific article is required, the position of the required pallet is found to release articles loaded on the pallet.

In the management of the parcel service or distribution, the article loaded on the pallet is managed based on the position of the pallet transported to the warehouse, the position of a specific pallet needs to be able to be more rapidly and accurately determined.

In order to solve the problem, Korean Unexamined Publication No. 10-2011-0037721 discloses an apparatus of generating goods map in a goods storing space, which includes a pallet attached with a tag emitting identification light and a recognition unit photographing the identification light emitted from the pallet. The technology generates the position map of the goods based on the position of the pallet recognized through such a configuration. The position of each goods can be easily in the goods storing space by using the generated goods map to shorten a time required to find the goods.

However, in the technology, only a specific pallet is identified to generate only the position map of the pallet. That is, information which is acquirable by using the goods map generating apparatus is just limited to information on the position of the specific pallet and when a plurality of heterogeneous goods are loaded on the specific pallet, loading patterns of the goods such as a loading method on the pallet, a loading amount, and the like cannot be found. In order to find such information, additional information related to the type of the goods loaded on the specific pallet is required.

SUMMARY OF THE INVENTION

An aspect of the present invention provides a method and a system that can provide loading position information for each article when a plurality of articles is loaded on a specific pallet.

In detail, an aspect of the present invention provides a method and a system that can check the position of the article on the pallet as well as information on a pallet on which a specific article is loaded.

According to an aspect of the present invention, there is provided a method of pallet packing, including: receiving pallet or article identification information from tags attached to a pallet or one or two or more articles loaded on the pallet; acquiring depth information regarding a whole area of the pallet by using a depth measurement sensor positioned to be spaced apart from the pallet by a predetermined distance in an upper vertical direction; and generating loading information of one or two or more articles by using the pallet identification information, the article identification information, and the depth information.

In this case, the loading information of the article may include identification information of a pallet on which the article is loaded, identification information of the article, and loading position information of the article.

In this case, the loading position information of the article may include a plane position value (x, y) for the pallet and a height value (z) of the article loaded on the pallet.

Alternatively, the loading position information of the article may include plane position region information for the pallet and height region information of the article loaded on loaded on the pallet.

The method may further include updating the article loading information when the received identification information or depth information of the article is changed.

In this case, the tags attached to the pallet and one or two or more articles may include one or more tags selected among an RFID tag, an NFC tag, and a QR code.

Further, the depth measurement sensor may include one or more selected among a depth camera, a stereo camera, a KINETIC camera, an IR camera, and a laser.

In addition, the method may further include generating a warning message when the depth information is equal to or less than a threshold value.

According to another aspect of the present invention, there is provided a system of pallet packing, including: a tag reader unit receiving identification information from tags attached to one or two or more articles; a depth measurement sensor positioned to be spaced apart from the pallet by a predetermined distance in an upper vertical direction and acquiring depth information on a whole area of the pallet; and a loading management unit generating or updating loading information of one or two or more articles by using the information received from the depth measurement sensor.

According to another aspect of the present invention, the system may further include a loading DB storing the loading information of one or two or more articles, and the loading information of the article may include identification information of a pallet on which the article is loaded, identification information of the article, and loading position information of the article.

In this case, the loading position information of the article may include a plane position value (x,y) for the pallet and a height value (z) of the article loaded on the pallet.

Alternatively, the loading position information of the article may include plane position region information for the pallet and height region information of the article loaded on loaded on the pallet.

In this case, the tags attached to the pallet and one or two or more articles may include one or more tags selected among an RFID tag, an NFC tag, and a QR code.

Further, the depth measurement sensor may include one or more selected among a stereo camera, a KINETIC camera, an IR camera, and a laser.

In addition, the system method may further include an alarm unit generating a warning message when the depth information acquired through the depth measurement sensor is equal to or less than a threshold value.

According to yet another aspect of the present invention, there is provided a method for providing pallet packing information by using loading information of an article, which includes pallet identification information, and identification information and positional information of one or two or more articles, the method including: providing pallet related information by using pallet identification information; and providing information on an article loaded on the pallet by using identification information and positional information of one or two or more articles, and positional information thereon.

In this case, the pallet related information, and article information and positional information thereon are provided in one or more formats selected among an audio signal, a text, and an image.

Further, information on one or two or more article images may be provided through the image distinguished for each article by using one or more selected among different colors and patterns.

In addition, the method may further include: receiving an input from a user; and providing loading information of an article corresponding to the input from the user.

Further, the method may further include providing the loading information on the article when a specific article is selected by the user.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Various conversions can be made in the present invention and the present invention can include various exemplary embodiments. Therefore, specific exemplary embodiments will be illustrated in drawings and described in detail in a detailed description. However, it should be appreciated that the present invention is not limited to specific exemplary embodiments, but the present invention includes all conversions, equivalents, or substitutions included in the spirit and the scope of the present invention. When it is determined that the detailed description of the related known art may obscure the gist of the present invention, the detailed description thereof will be omitted.

Terms such as 'first', 'second', etc. can be used to describe various components, but the components are not to be construed as being limited to the terms. The terms are only used to differentiate one component from other components.

Terms used in the application are just used to describe illustrative exemplary embodiments and are not to be construed as limiting the present invention. Singular expression includes plural expressions as long as the expressions do not have apparently different contextual meanings. In this specification, terms such as 'include' or 'have' is used to designate presence of implemented features, figures, steps, operations, elements, parts, or combinations thereof and it should be understood that presence or addition possibilities of presence or addition possibilities of one or more other features or figures, steps, operations, elements, parts, or combinations thereof are not excluded in advance.

Exemplary embodiments of the present invention will now be described in detail with reference to the accompanying drawings.

Figure 1:
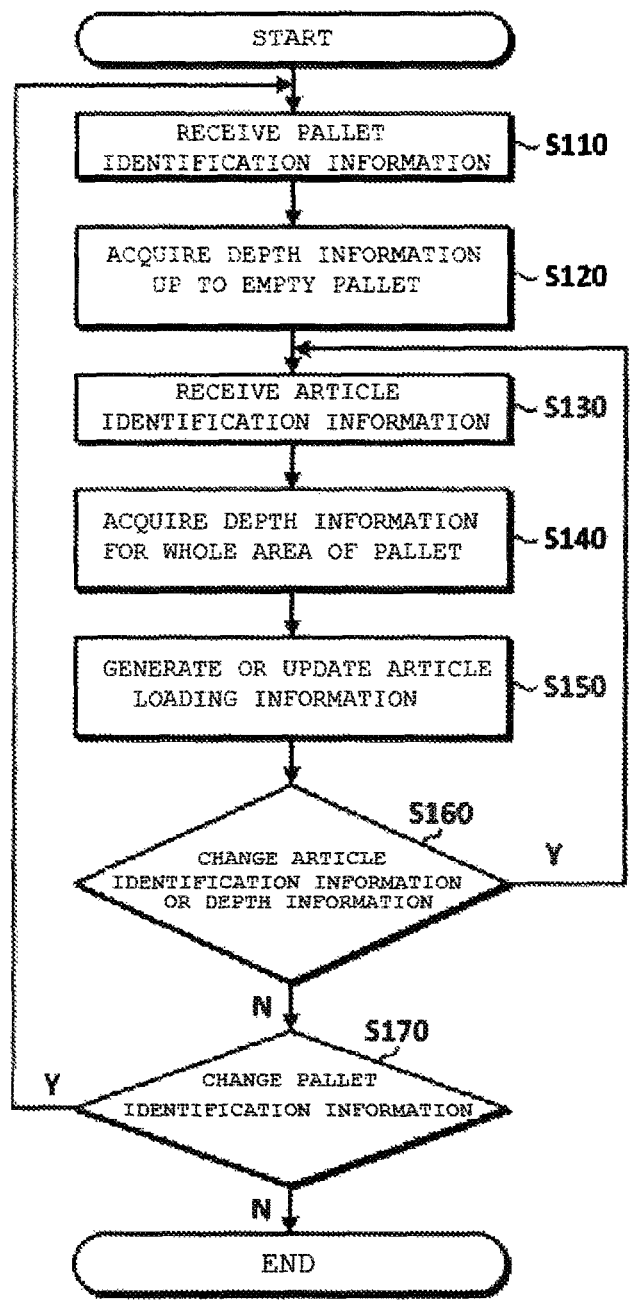
FIG. 1 is a flowchart illustrating a method of pallet packing according to an exemplary embodiment of the present invention.

FIG. 1 is a flowchart illustrating a method of pallet packing according to an exemplary embodiment of the present invention.

As illustrated in FIG. 1, the method of pallet packing according to the exemplary embodiment of the present invention includes: receiving pallet or article identification information from tags attached to a pallet or one or two or more articles loaded on the pallet; acquiring depth information regarding a whole area of the pallet by using a depth measurement sensor positioned to be spaced apart from the pallet by a predetermined distance in an upper vertical direction; generating loading information of one or two or more articles by using the pallet identification information, the article identification information, and the depth information; and updating the article loading information when the received identification information and depth information of the article.

First, the pallet identification information is received from the tag attached to the pallet (S110). In more detail, when an empty pallet is positioned at a place where the article is newly loaded, the identification information of the pallet is received from the tag attached to the pallet.

In this case, as the identification information of the pallet, information regarding the pallet such as a shape, a size, an appropriate weight, a color, a manufacture, and the like of the pallet may be adopted. As one example, the pallet identification information may include an area, a limited loading weight, and ID information of the pallet and the information may be utilized to distinguish which articles are loaded on a specific pallet, whether a total weight of the articles loaded on the pallet is equal to or less than the appropriate weight of the pallet, and the like.

In the exemplary embodiment of the present invention, one or more tags selected among an RFID tag, an NFC tag, and a QR code may be adopted as the tag attached to the pallet. As one example, the RFID tag embedded with an internal battery and a transmission device therein is attached to the pallet and a tag reader of the pallet packing system may be received the pallet identification information from the RFID tag when necessary.

Further, in another exemplary embodiment of the present invention, as the tag, a passive RFID tag may be adopted. The passive RFID tag does not have an additional cell unlike an active RFID tag, and rectifies an electromagnetic wave transmitted from the reader to use the rectified electromagnetic wave as its own power supply in order to acquire its own operating electric power. In particular, since the passive RFID tag has a relatively simple structure and thus it is convenient to maintain and manage the passive RFID tag, the passive RFID tag is primarily used during production and supply to be more easily applied to the pallet packing method.

Besides, the identification information of the corresponding pallet may be received even through the NFC tag or the QR code. The identification information jay be received by using an NFC reader similarly as an RFID reader or related identification information may be received from the QR code through an additional barcode reader.

The pallet identification information is received through step S110 and depth information up to the empty pallet may be acquired by using the depth measurement sensor positioned to be spaced apart from the pallet by the predetermined distance in the upper vertical direction (S120). In this case, the depth information means distance information up the whole area of the empty pallet from the depth measurement sensor. A 3D image of the empty pallet may be acquired by using the distance information and the depth information of the empty pallet may be used as a reference value at the time of loading the article. Hereinafter, the depth measurement sensor will be described in detail with reference to FIG. 2.

A depth camera may be adopted as the depth measurement sensor in the exemplary embodiment of the present invention. The depth camera calculates distance information by acquiring a ray returned by reflecting a laser or infra-red (IR) on an object or a target region. The depth camera is capable of acquiring depth information corresponding to a high-resolution image and each pixel one to one. In this case, as one applied example of the depth camera, a KINECT sensor may be used. The KINECT sensor determines a distance from a subject on a specific region by using light having a specific pattern, which is called structured light. In more detail, when the structured light is irradiated onto a stereoscopic surface, the pattern is distorted along a stereoscopic curve and since an original pattern is found, a distance up to each pixel may be calculated by using the distorted shape.

Further, as the depth measurement sensor, a stereo camera may be adopted. The stereo camera may acquire two images by photographing the same object with two photographing lenses being spaced apart from at a predetermined interval and acquire a stereoscopic image by using a disparity between two images. That is, the stereoscopic image for a specific subject may be acquired by using the stereo camera and in the present invention, the depth information on the whole area of the pallet may be acquired by using the aforementioned method.

Figure 2:
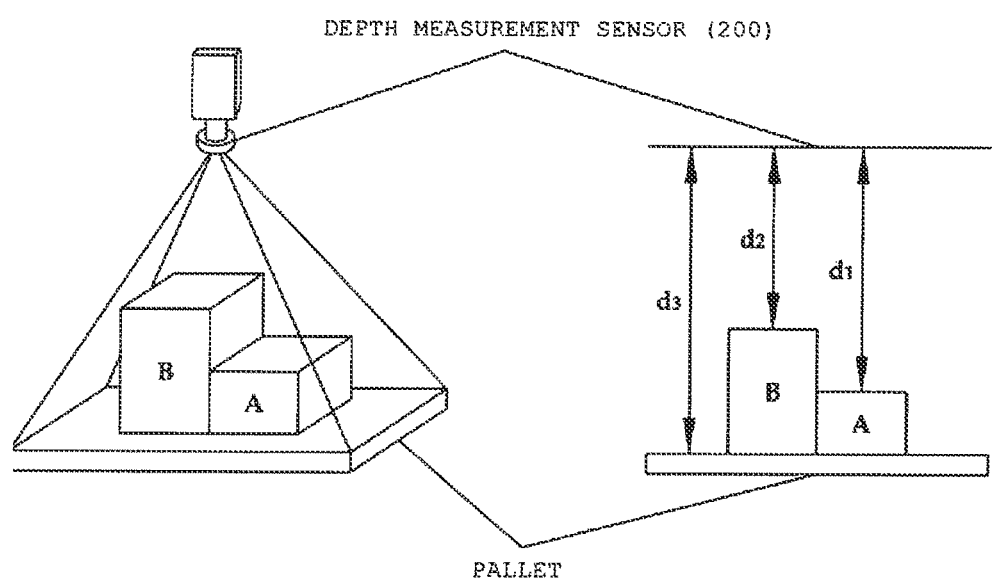
FIG. 2 is a diagram illustrating a method of acquiring depth information through a depth measurement sensor.

FIG. 2 is a diagram illustrating a method of acquiring depth information through a depth measurement sensor.

As illustrated in FIG. 2, the depth measurement sensor 200 is positioned to be spaced apart from the pallet by the predetermined distance in the upper vertical direction to acquire the depth information on the whole area of the pallet. In detail, the depth information on the whole area of the pallet is acquired to acquire the depth information on the pallet or article from the depth measurement sensor. In FIG. 2, distances up to articles A and B and the pallet from the depth measurement sensor 200 are $d_1$, $d_2$, and $d_3$, respectively. The depth measurement sensor 200 may acquire depth information on a pallet region by using the distance information. In this case, the distance information disparity may be expressed by a difference in shading of the image. For example, an article which is positioned distant may be expressed to be dark, while an article which is positioned close may be expressed to be bright.

Further, the depth measurement sensor is configured for 3D modeling of a pallet and an article loaded on the pallet and as a method of acquiring depth information by using the depth measurement sensor in the exemplary embodiment of the present invention, a 3D range scanner, a method using a structured ray pattern, and other passive 3D modeling technology may be adopted.

Article identification information is received from tags attached to one or two or more articles loaded on the pallet (S130). In this case, as the tags attached to the articles, the active RFID tag and the passive RFID tag may be adopted similarly as the tag attached to the pallet. Besides, the NFC tag, the QR code, and the like may also be adopted. Hereinafter, since a description of the tags is redundant, the description of the tags will be omitted.

In the exemplary embodiment of the present invention, the article identification information received from the tag attached to the article may include information such as a type, a capacity, a size, a weight, an expiration rate, a manufacturer, and an owner of the article. As one example, the owner, the capacity, or the size of the article may be checked by using the article identification information. In particular, the size information of the article may be hereinafter used as an index for calculating a pattern in which the article is loaded. It will be able to be appreciated by those skilled in the art that the article identification information can be implemented in a transformed form within the scope without departing from an intrinsic characteristic of the present invention.

The depth information regarding the whole area of the pallet is acquired by using the depth measurement sensor (S140). In more detail, the depth information regarding the whole pallet area on which one or two or more articles are loaded is acquired. 3D shape information regarding a pattern in which articles are loaded on a pallet at present may be acquired through the depth information.

In the exemplary embodiment of the present invention, step S140 may be performed simultaneously with step S130 or before step S130. Further, only when new article identification information is received through step S130, the depth information may be acquired. In the present invention, a performing order of steps S130 and S140 may be variously applied.

Thereafter, loading information of the article is generated or updated by using the pallet identification information the article identification information, and the depth information (S150). In more detail, when the article is loaded on an empty pallet at the first stage, article loading information is newly generated and thereafter, when the article is additionally loaded, the article loading information is updated by using information on the added article.

In the exemplary embodiment of the present invention, the article loading information may include information on an article type (article identification information) and a loading method (loading position information of the article) on a specific pallet (pallet identification information).

As one example, when articles A, B, and C are loaded on a specific pallet X, the article loading information may be expressed as illustrated in Table 1 below.

TABLE 1

| Pallet identification information | Article identification information | Article loading position information |
|---|---|---|
| X | A | (x1, y1, z1) |
|   | B | (x2, y2, z2) |
|   | C | (x3, y3, z3) |

The loading position information of the article may be acquired by using a change amount of the depth information acquired through the depth measurement sensor. In detail, when a specific article is loaded on the pallet, a difference in depth information for the whole area of the pallet occurs before and after the article is loaded. When the difference in depth information for the whole area of the pallet occurs while identification information of the specific article is received by using such a property, it may be sensed that an article of which identification information is received is newly loaded in a region where the difference occurs.

In the exemplary embodiment of the present invention, the article loading position information may be set by a 3D coordinate as illustrated in Table 1 above. In this case, a 2D coordinate (x, y) for one plane of a pallet on which an article is loaded and a loading height (z) of the article from the pallet may be applied to the 3D coordinate. As the 3D coordinate information, an average value of a depth information change amount may be adopted. As one example, when a regular hexahedron having each side of 2 cm is newly loaded with (0, 0, 0) as one point, (1, 1, 1) which is a center value of a region where the regular hexahedron is loaded may be adopted as the 3D coordinate information.

When loading position information of a specific article is simply configured by the 3D coordinate information as described above, the size of loading information of the article may be effectively reduced. Thereafter, when information on a region where the article is actually loaded is generated, the 3D coordinate information and the size information of the article included in the identification information of the article may be used.

Further, in another exemplary embodiment of the present invention, the article loading position information may be set by not the 3D coordinate information but region information. In detail, information on a volume region indicated by the depth information change amount may be adopted as loading position information of a specific article. In this case, the loading position information may include plane position region information for a pallet and height region information from the pallet. When the loading position information of the specific article is configured by the volume region information as described above, an actual loading position and an actual loading pattern of the article may be easily determined.

Article loading information may be generated or updated by using the positional information of the article acquired by the aforementioned method. In the exemplary embodiment of the present invention, since one or two or more may be adopted as the number of articles loaded on the pallet, the article loading information may include one or two or more article information and article positional information corresponding to one pallet information. It will be able to be appreciated by those skilled in the art that the article loading information can be implemented in a transformed form within the scope without departing from an intrinsic characteristic of the present invention.

In the exemplary embodiment of the present invention, when the article loading information is generated or updated through step S150, it may be judged whether received article identification information or depth information is changed (S160). When the article identification information or depth information is changed, the type or position of the article loaded on the pallet is changed to additionally update the article loading information through steps S130, S140, and S150.

Further, in the exemplary embodiment of the present invention, it may be judged whether received pallet identification information is changed (S170). When the received pallet identification information is changed in step S170, loading an article on a new pallet is started and article loading information on the new pallet is generated through steps S110, S120, S130, S140, and S150.

Further, in the exemplary embodiment of the present invention, the method may further include generating a warning message when the article depth information is equal to or less than a threshold value. Since article loading at an appropriate height is required for stable loading and unloading of the article, when the depth information measured through the depth measurement sensor is equal to or less than a predetermined value or less, a warning message indicating that longer loading is dangerous may be generated.

When the pallet is unloaded and unpacked, the type and the positional information of the article loaded on the pallet may be provided to an unloader through the article loading information. In the exemplary embodiment of the present invention, the unloader may check the article loading information through an additional monitor or terminal and unload the loaded article. A method for providing pallet packing information will be hereinafter described in detail with reference to FIGS. 4 and 5.

Figure 3:
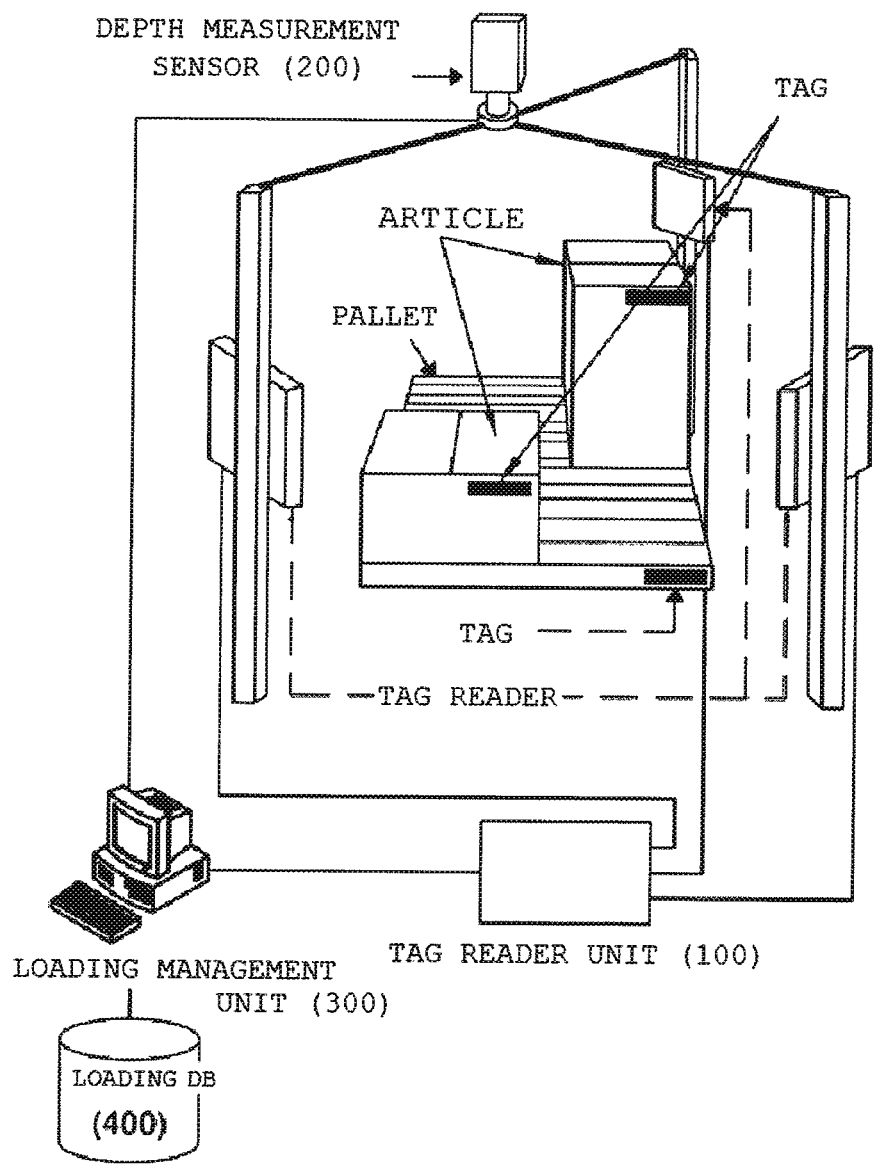
FIG. 3 is a diagram illustrating a system of pallet packing according to another exemplary embodiment of the present invention.

FIG. 3 is a diagram illustrating a system of pallet packing according to another exemplary embodiment of the present invention.

As illustrated in FIG. 3, the system of pallet packing according to the exemplary embodiment of the present invention includes: a tag reader unit 100 receiving identification information from tags attached to a pallet, and one or two or more articles; a depth measurement sensor 200 positioned to be spaced apart from the pallet by a predetermined distance in an upper vertical direction and acquiring depth information on a whole area of the pallet; a loading management unit 300 generating or updating loading information of one or two or more articles by using the information received from the depth measurement sensor 200 and the tag reader unit 100; and a loading DB 400 storing the loading information of one or two or more articles.

The tag reader unit 100 receives corresponding identification information from the tags attached to the pallet and one or two or more articles. In this case, the tag reader unit 100 may receive the pallet related information such as a shape, a size, an appropriate weight, a color, a manufacturer, a pallet ID information, and the like of the pallet as the identification information of the pallet and receive article related information such as a type, a capacity, a size, a weight, an expiration date, a manufacturer, owner information, and the like of the article as the identification information of the article. Since respective examples of the identification information have been described above, the examples will be hereinafter omitted.

In the exemplary embodiment of the present invention, the tag reader unit 100 may receive related identification information from one or more selected from an RFID tag, an NFC tag, and a QR code. As the exemplary embodiment, as the tag reader unit 100, a passive RFID tag reader or an active RFID tag reader may be adopted. Alternatively, an apparatus that may receive NFC tag information may be adopted. As yet another exemplary embodiment, as the tag reader unit 100, a camera or an image acquiring device that may related identification information from a QR code attached to the pallet or article may be adopted.

In the exemplary embodiment of the present invention, the tag reader unit 100 may be positioned in an optimized form to receive the identification information from the tags of the pallet and the article. For example, as illustrated in FIG. 3, three or more readers are positioned on the periphery of the pallet region to receive the identification information. In the exemplary embodiment of the present invention, the identification information of the pallet and the article loaded on the pallet may be received without omission through the configuration. However, this is the example embodiment and the present invention is not limited thereto.

Thereafter, the tag reader unit 100 transmits the received identification information of the pallet and the article to the loading management unit 300 and thereafter, is used to generate the loading information of the article.

The depth measurement sensor 200 is positioned to be spaced apart from the pallet by the predetermined distance in the upper vertical direction to acquire depth information on a whole area of the pallet. In detail, the depth measurement sensor 200 acquires depth information up to one plane of the pallet or one or two or more articles from the depth measurement sensor 200. The depth information is distance information up to the pallet or the loaded article from the depth measurement sensor 200 and 3D shape information in which the article is loaded on the pallet may be acquired through the distance information. Since the depth information is described in detail through FIG. 2, the depth information will be omitted.

A depth camera may be adopted as the depth measurement sensor 200 in the exemplary embodiment of the present invention. The depth camera calculates distance information by acquiring a ray returned by reflecting a laser or infra-red (IR) on an object or a target region. The depth camera is capable of acquiring depth information corresponding to a high-resolution image and each pixel one to one. In this case, as one applied example of the depth camera, a KINECT sensor may be used. The KINECT sensor determines a distance from a subject on a specific region by using light having a specific pattern, which is called structured light. In more detail, when the structured light is irradiated onto a stereoscopic surface, the pattern is distorted along a stereoscopic curve and since an original pattern is found, a distance up to each pixel may be calculated by using the distorted shape.

Further, as the depth measurement sensor 200, a stereo camera may be adopted. The stereo camera may acquire two images by photographing the same object with two photographing lenses being spaced apart from at a predetermined interval and acquire a stereoscopic image by using a disparity between two images. That is, the stereoscopic image for a specific subject may be acquired by using the stereo camera and in the present invention, the depth information on the whole area of the pallet may be acquired by using the aforementioned method.

The loading management unit 300 generates or updates the article loading information by using the information received from the tag reader unit 100 and the depth measurement sensor 200. In more detail, when the article is loaded on an empty pallet at the first stage, article loading information is newly generated and thereafter, when the article is additionally loaded, the article loading information is updated.

In the exemplary embodiment of the present invention, the article loading information may include information on an article type (article identification information) and a loading method (loading position information of the article) on a specific pallet (pallet identification information).

As one example, when articles A, B, and C are loaded on a specific pallet X, the article loading information may be expressed as illustrated in Table 2 below.

TABLE 2

| Pallet identification information | Article identification information | Article loading position information |
|---|---|---|
| X | A | (x1, y1, z1) |
|   | B | (x2, y2, z2) |
|   | C | (x3, y3, z3) |

The loading position information of the article may be acquired by using a change amount of the depth information acquired through the depth measurement sensor. In detail, when a specific article is loaded on the pallet, a difference in depth information for the whole area of the pallet occurs before and after the article is loaded. When the difference in depth information for the whole area of the pallet occurs while identification information of the specific article is received by using such a property, it may be sensed that an article of which identification information is received is newly loaded in a region where the difference occurs.

In the exemplary embodiment of the present invention, the article loading position information may be set by a 3D coordinate as illustrated in Table 2 above. In this case, a 2D coordinate (x, y) for one plane of a pallet on which an article is loaded and a loading height (z) of the article from the pallet may be applied to the 3D coordinate. As the 3D coordinate information, an average value of a depth information change amount may be adopted. As one example, when a regular hexahedron having each side of 2 cm is newly loaded with (0, 0, 0) as one point, (1, 1, 1) which is a center value of the regular hexahedron is loaded may be adopted as the 3D coordinate information.

When loading position information of a specific article is simply configured by the 3D coordinate information as described above, the size of loading information of the article may be effectively reduced. Thereafter, when information on a region where the article is actually loaded is generated, the 3D coordinate information and the size information of the article included in the identification information of the article may be used.

Further, in another exemplary embodiment of the present invention, the article loading position information may be set by not the 3D coordinate information but region information. In detail, information on a volume region indicated by the depth information change amount may be adopted as loading position information of a specific article. In this case, the loading position information may include plane position region information for a pallet and height region information from the pallet. When the loading position information of the specific article is configured by the volume region information as described above, an actual loading position and an actual loading pattern of the article may be easily determined.

The loading management unit 300 may generate or update article loading information by using the positional information of the article acquired by the aforementioned method. In the exemplary embodiment of the present invention, since one or two or more may be adopted as the number of articles loaded on the pallet, the article loading information may include one or two or more article information and article positional information corresponding to one pallet information. It will be able to be appreciated by those skilled in the art that the article loading information can be implemented in a transformed form within the scope without departing from an intrinsic characteristic of the present invention.

The loading management unit 300 may store and manage the article loading information in the loading DB 400.

The loading DB 400 may store the article loading information. Information on a type and a position of an article loaded on a specific pallet may be provided to an unloader when the pallet is unloaded and unpacked by using the article loading information stored in the loading DB 400. In the exemplary embodiment of the present invention, the unloader may check the article loading information stored in the loading DB 400 through an additional monitor or terminal and check the loaded article. A method for providing pallet packing information will be hereinafter described in detail with reference to FIGS. 4 and 5.

Further, in the exemplary embodiment of the present invention, when the depth information acquired through the depth measurement sensor 200 is equal to or less than a threshold value, an alarm unit (not illustrated) that generates a warning message may be further included. Since article loading at an appropriate height is required for stable loading and unloading of the article, when the depth information measured through the depth measurement sensor is equal to or less than a predetermined value or less, the alarm unit (not illustrated) may generate a warning message indicating that longer loading is dangerous.

Article loading information including information on a state on one or two or more articles are loaded may be generated through the pallet packing method and the pallet packing system, and the article loading information may be provided to users through various methods. Hereinafter, the method for providing pallet packing information will be described in detail.

The method for providing pallet packing information according to the exemplary embodiment of the present invention includes: providing pallet related information by using pallet identification information; and providing information on an article loaded on the pallet by using identification information and positional information of one or two or more articles, and positional information thereon.

In this case, the user may receive the pallet packing information through various methods. For example, the pallet packing information may be provided to the user through one or more selected among an audio signal, a text, an image, and the like.

The respective aforementioned information providing methods will be described in detail with reference to Table 3 below.

TABLE 3

| Pallet identification information | Article identification information | Article loading position information |
|---|---|---|
| X | A | (x1, y1, z1) |
|   | B | (x2, y2, z2) |
|   | C | (x3, y3, z3) |

When the pallet packing information is generated, as illustrated in Table 3 above, the pallet packing information according to the exemplary embodiment of the present invention may be provided in such a pattern that "articles A, B, and C are loaded on a pallet X, and the articles A, B, and C are loaded at (x1,y1,z1), (x2,y2,z2), and (x3,y3,z3), respectively." through the audio signal.

In this case, the loading position information of each article may be provided as coordinate information and may be provided as position region information.

Further, the method for providing pallet packing information may be set by the user and the number of information, the order of the information, and the like provided by user's setting may be changed. It will be able to be appreciated by those skilled in the art that the method for providing pallet packing information can be implemented in a transformed form within the scope without departing from an intrinsic characteristic of the present invention.

As yet another example, loading information on all articles loaded on a specific pallet is not provided but only loading information on a specific article input by the user may be provided.

To this end, an additional search tool that may inputs such as an article related ID, a keyword, and the like from the user may be provided or the information on all of the articles loaded on the specific pallet may be provided as a list. In this case, the list includes a method for related information in an image format in addition to a text format. That is, as one example of the present invention, the information on the articles loaded on the specific pallet may be provided in a list format in which the related information is arranged as a text or a list format in which a pattern in which the articles are loaded is expressed as an image.

Thereafter, when a specific article in the list is selected by the user, only the loading information on the article may be provided. The method for providing the loading information on the specific article may be provided to the user through one or more methods selected among the audio signal, the text, the image, and the like.

A method for providing related information as the text may be adopted similarly as the method for providing the related information through the audio signal. That is, the methods are just different from each other in that the related information is provided as not the audio signal but the text and a type, content, and the like of the provided information may be similarly adopted. Therefore, a detailed description thereof will be omitted.

Further, the pallet packing information may be provided as the image. Hereinafter, one example of providing the pallet packing information as the image will be described in detail.

Figure 4:
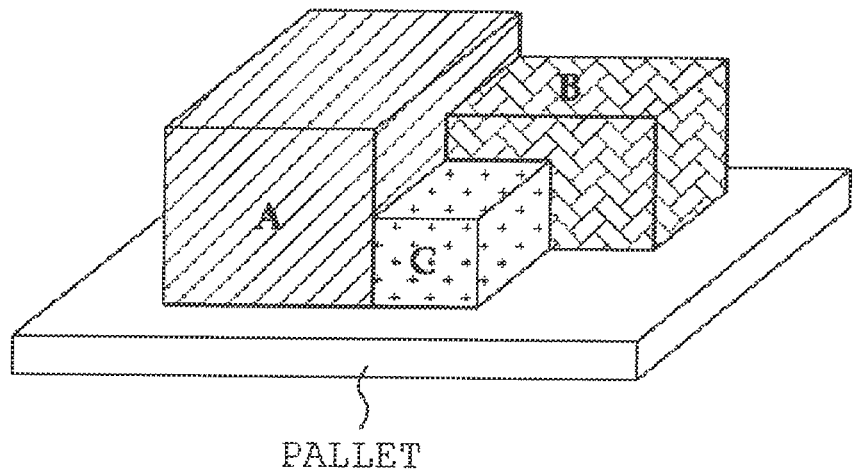
FIGS. 4 and 5 are diagrams illustrating a method for providing pallet packing information in an image pattern according to yet another exemplary embodiment of the present invention.
Figure 5:
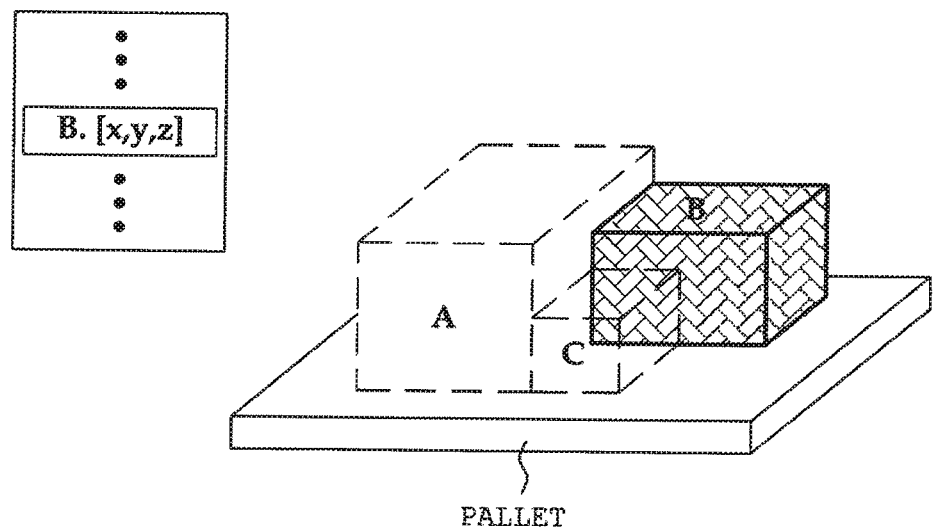

FIGS. 4 and 5 are diagrams illustrating a method for providing pallet packing information in an image pattern according to yet another exemplary embodiment of the present invention.

First, as illustrated in FIG. 4, the pallet packing information according to the exemplary embodiment of the present invention may be provided as a loading image of a pallet and one or two or more articles loaded on the pallet. In more detail, since the loading information of the article includes pallet identification information, and identification information and positional information of one or two or more articles, information on a pallet packing state may be provided as an image by using the information in the method for providing pallet packing information according to the exemplary embodiment of the present invention. Hereinafter, the method for providing the information as the image will be described in detail.

As described above, the pallet identification information may include the pallet related information such as the shape, the size, the appropriate weight, the color, the manufacturer, the pallet ID information, and the like of the pallet. Therefore, an image of a corresponding pallet is provided by using the information to be provided to the user. As one example, information that the pallet has a volume 10 m×10 m×0.5 m and is generally made of plastic may be acquired through the pallet identification information and the pallet image may be provided by using the information as illustrated in FIGS. 4 and 5. Preferably, the image of the pallet may be provided by a 3D image and the image may be provided to rotate according to an input by the user.

Further, the identification information of the article may include the article related information such as the type, the capacity, the size, the weight, the expiration date, the manufacturer, the owner information, and the like of the article, and the positional information of the article may include center coordinate information or region information regarding the position on which the article is loaded. Therefore, a loading image indicating how a specific article is loaded on the pallet may be provided by using the information.

For example, it may be determined that a whole size of the article A is a×b×c m$^3$ and the article A is loaded on a specific position (x1,y1,z1) on the pallet, through the identification information of the article and the positional information of the article, and a loading image of the specific article A may be provided on the pallet image as illustrated in FIGS. 4 and 5 by using the information. In this case, the image of the article A may also be provided by the 3D image similarly as the image of the pallet and the image may be provided to rotate according to the input by the user.

Alternatively, the type of the article B and information on a position on which the article B is loaded may not be determined as simple coordinate information, but may be determined as region information (3D region information) through the identification information of the article and the positional information of the article. A loading image of the specific article B may be provided on the pallet image as illustrated in FIGS. 4 and 5 by using the information.

In FIGS. 4 and 5, expressions such as 'A', 'B', and 'C' are used in order to express that the articles A to C are components distinguished from each other, but as an actual example, the articles A to C may be expressed by one or more information selected among the type, the size, the owner information, and the like of the article. Further, an expression method or format of the information may be previously set by a manager or changed by the user.

In this case, one or two or more article images may be provided to be distinguished for each article by using one or more selected among different colors and patterns so that the respective articles are provided as images distinguished from each other. In FIGS. 4 and 5, one example configured by different patterns is illustrated, but the articles may be expressed by different colors (e.g., red, blue, yellow, and the like) so as to easily the respective articles.

Further, in the method for providing pallet packing information according to another exemplary embodiment of the present invention, a list of one or two or more articles may be provided as illustrated in FIG. 5.

In FIG. 5, a technology configuration that provides a specific article name (e.g., 'B') and the position (e.g., 'x, y, z') of the article through an additional list is illustrated. However, this is just one example and one or more selected among a series of info nation on the specific article may be provided on the list.

In this case, in the exemplary embodiment of the present invention, when the specific article is selected from the list of the articles by the user, the image of the article may be emphasized and displayed. As one example, when the article B is selected as illustrated in FIG. 5, articles other than the article B is expressed to be transparent and an outline of the article B is expressed to be thick to emphasize and display the article B at the same time.

In the present invention, 'emphasizing and displaying' the image of the article means that the image of the article is displayed more prominently than images of other articles. That is, 'emphasizing and displaying' the image of the article means displaying the selected article to easily determine a loading position of the article selected among all articles loaded on the pallet when the specific article is selected by the user. As one example, a method may be adopted, which displays all of articles other than the specific article to be opaque or colors of articles other than the specific article with a single color such as a black, or the like. It will be able to be appreciated by those skilled in the art that the method of 'emphasizing and displaying' the image of the article can be implemented in a transformed form within the scope without departing from an intrinsic characteristic of the present invention.

Further, detailed loading information of the selected article may be provided. As one example, the type of the article, the loading position information of the article, and the like may be provided.

Hereinabove, the present invention has been described based on the exemplary embodiments. It will be able to be appreciated by those skilled in the art that the present invention can be implemented in a transformed form within the scope without departing from an intrinsic characteristic of the present invention. Therefore, the disclosed exemplary embodiments should be considered not in a limited viewpoint but a descriptive viewpoint. The scope of the present invention is shown in not the above description but the appended claims and it should be understood that all differences within a scope equivalent thereto are included in the present invention.

As set forth above, according to exemplary embodiments of the present invention, a method and a system of pallet packing can generate loading information to determine a loading method of a plurality of articles on a specific pallet.

Further, a method for providing pallet packing information can easily check a loading position of a specific article among the articles loaded on the pallet by using loading information acquired through the aforementioned method.

While the present invention has been shown and described in connection with the exemplary embodiments, it will be apparent to those skilled in the art that modifications and variations can be made without departing from the spirit and scope of the invention as defined by the appended claims.

What is claimed is:

1. A method of pallet packing, comprising:
   receiving pallet or article identification information from tags attached to a pallet or one or two or more articles loaded on the pallet;
   acquiring depth information regarding a whole area of the pallet by using a depth measurement sensor positioned to be spaced apart from the pallet by a predetermined distance in an upper vertical direction; and
   generating loading information of one or two or more articles by using the pallet identification information, the article identification information, and the depth information, the loading information includes loading position information of the article, wherein
   the loading position information of the article includes a plane position value (x, y) for the pallet and a height value (z) of the article loaded on the pallet.

2. The method of claim 1, wherein:
   the loading information of the article includes identification information of a pallet on which the article is loaded, identification information of the article.

3. A method of pallet packing, comprising:
receiving pallet or article identification information from tags attached to a pallet or one or two or more articles loaded on the pallet;
acquiring depth information regarding a whole area of the pallet by using a depth measurement sensor positioned to be spaced apart from the pallet by a predetermined distance in an upper vertical direction; and
generating loading information of one or two or more articles by using the pallet identification information, the article identification information, and the depth information, the loading information includes loading position information of the article, wherein:
the loading position information of the article includes plane position region information for the pallet and height region information of the article loaded on the pallet.

4. The method of claim 1, further comprising:
updating the article loading information when the received identification information or depth information of the article is changed.

5. The method of claim 1, wherein:
the tags attached to the pallet and one or two or more articles include one or more tags selected among an RFID tag, an NFC tag, and a QR code.

6. The method of claim 1, wherein:
the depth measurement sensor includes one or more selected among a depth camera, a stereo camera, a KINETIC camera, an IR camera, and a laser.

7. A method of pallet packing, comprising:
receiving pallet or article identification information from tags attached to a pallet or one or two or more articles loaded on the pallet;
acquiring depth information regarding a whole area of the pallet by using a depth measurement sensor positioned to be spaced apart from the pallet by a predetermined distance in an upper vertical direction; and
generating loading information of one or two or more articles by using the pallet identification information, the article identification information, and the depth information, further comprising:
generating a warning message when the depth information is equal to or less than a threshold value.

8. A system of pallet packing, comprising:
a tag reader unit receiving identification information from tags attached to one or two or more articles;
a depth measurement sensor positioned to be spaced apart from the pallet by a predetermined distance in an upper vertical direction and acquiring depth information on a whole area of the pallet; and
a loading management unit generating or updating loading information of one or two or more articles by using the information received from the depth measurement sensor and the tag reader, the loading information includes loading position information of the article,
wherein loading position information of the article includes a plane position value (x, y) for the pallet and a height value (z) of the article loaded on the pallet.

9. The system of claim 8, further comprising:
a loading DB storing the loading information of one or two or more articles,
wherein the loading information of the article includes identification information of a pallet on which the article is loaded, and identification information of the article.

10. A system of pallet packing, comprising:
a tag reader unit receiving identification information from tags attached to one or two or more articles;
a depth measurement sensor positioned to be spaced apart from the pallet by a predetermined distance in an upper vertical direction and acquiring depth information on a whole area of the pallet; and
a loading management unit generating or updating loading information of one or two or more articles by using the information received from the depth measurement sensor and the tag reader, the loading information includes loading position information of the article, wherein:
the loading position information of the article includes plane position region information for the pallet and height region information of the article loaded on the pallet.

11. The system of claim 8, wherein:
the tags attached to the pallet and one or two or more articles include one or more tags selected among an RFID tag, an NFC tag, and a QR code.

12. The system of claim 8, wherein:
the depth measurement sensor includes one or more selected among a stereo camera, a KINETIC camera, an IR camera, and a laser.

13. A system of pallet packing, comprising:
a tag reader unit receiving identification information from tags attached to one or two or more articles;
a depth measurement sensor positioned to be spaced apart from the pallet by a predetermined distance in an upper vertical direction and acquiring depth information on a whole area of the pallet; and
a loading management unit generating or updating loading information of one or two or more articles by using the information received from the depth measurement sensor and the tag reader, further comprising:
an alarm unit generating a warning message when the depth information acquired through the depth measurement sensor is equal to or less than a threshold value.

14. A method for providing pallet packing information by using loading information of an article, which includes pallet identification information, and identification information and positional information of one or two or more articles, the method comprising:
providing pallet related information by using pallet identification information; and
providing information on an article loaded on the pallet by using identification information and positional information of one or two or more articles, and positional information thereon,
wherein the pallet related information, and article information and positional information thereon are provided in one or more formats selected among an audio signal, a text, and an image.

15. A method for providing pallet packing information by using loading information of an article, which includes pallet identification information, and identification information and positional information of one or two or more articles, the method comprising:
providing pallet related information by using pallet identification information; and
providing information on an article loaded on the pallet by using identification information and positional information of one or two or more articles, and positional information thereon, wherein:
information on one or two or more articles is provided through the image distinguished for each article by using one or more selected among different colors and patterns.

16. The method of claim 14, further comprising:
receiving an input from a user; and
providing loading information of an article corresponding to the input from the user.

17. The method of claim 14, further comprising:
providing the loading information on the article when a specific article is selected by the user.

* * * * *